United States Patent [19]
Derbyshire

[11] 3,910,589
[45] Oct. 7, 1975

[54] ELECTRICALLY INSULATED DRILL CHUCK FOR PORTABLE ELECTRIC POWER DRILLS

[75] Inventor: George C. Derbyshire, Sheffield, England

[73] Assignee: The Jacobs Manufacturing Co., Ltd., Sheffield, England

[22] Filed: Mar. 6, 1974

[21] Appl. No.: 448,652

[52] U.S. Cl. .............. 279/61; 279/1 Q; 408/710
[51] Int. Cl.² ........................................ B23B 31/04
[58] Field of Search .............. 279/1 Q, 61; 408/710; 310/47, 50

[56] References Cited
UNITED STATES PATENTS

| | | | |
|---|---|---|---|
| 1,940,405 | 12/1933 | Englund | 279/61 |
| 3,610,641 | 10/1971 | Ryder | 279/1 Q |
| 3,685,843 | 8/1972 | Jacyno | 279/1 Q |
| 3,797,960 | 3/1974 | McCarthy | 279/1 Q |

*Primary Examiner*—Gil Weidenfeld
*Attorney, Agent, or Firm*—Stephen J. Rudy

[57] ABSTRACT

A drill chuck mountable to the driving spindle of an electric power drill in which various parts of the chuck, such as the body, the sleeve, the sleeve and the body, or other interconnecting elements may be formed of electrically insulating plastics material in an arrangement relative to the metal jaws, the metal jaw adjusting bevel gear and associated nut, whereby there is no electrically conducting path from the jaws to the driving spindle and user if by inadvertence the user should drill into a live electric cable, or touch the sleeve of the chuck before withdrawing the drill.

5 Claims, 8 Drawing Figures

ELECTRICALLY INSULATED DRILL CHUCK FOR PORTABLE ELECTRIC POWER DRILLS

BACKGROUND OF THE INVENTION

The invention relates to drill chucks and has for its object to provide an improvement therein.

Portable electric power drills are commonly provided with sufficient insulation to ensure that it is almost impossible for the user to receive an electric shock from the power supply to the drill. However, it is still possible for the user to receive an electric shock if by inadvertence he should happen to drill into a live electric cable, that is, if he touches the drill chuck before withdrawing the drill. In addition to this hazard, there is the somewhat less serious risk that drilling into a live electric cable will burn out the windings of the power drill motor. It is an object of the invention to at least alleviate these dangers.

According to the invention, there is provided a drill chuck for an electric power drill, the chuck having a body part in which converging apertures are formed for the reception of respective jaws, said body part being made at least in part of an electrically insulating synthetic plastics material and the arrangement being such that when the chuck is mounted on a power tool driving spindle the body part ensures that there is no electrically conducting path from the jaws to said driving spindle. The body part may have a metal insert adapted for connection to a power tool driving spindle, as for example, by having a screw-threaded spigot portion or a female threaded portion. Alternatively, the synthetic plastics body part may itself be provided with an integral spigot portion or with a female threaded portion for connection to a power tool driving spindle. A cylindrical portion of the body part having at least one radial blind bore formed therein for the reception of a pilot end of an extraneous chuck key will preferably be provided with metal reinforcement for said bore or bores, such metal reinforcement conveniently taking the form of a metal band encircling said body part, preferably having been secured thereon during the moulding of the body part, or taking the form of respective metallic plug portions in which the radial bore or bores are formed. A cylindrical sleeve which encircles the body part will also preferably be made of a synthetic plastics material. The body part may be provided intermediate its ends with a circumferential groove in which a nut which is formed in halves and which has threaded engagement with the jaws is located. On the other hand, the body part may be provided intermediate its ends with a circumferential flange, and a nut which is formed in halves and which has threaded engagement with the jaws may be held together and in abutment with the flange by means which embrace said flange. In this case, the means which embrace the flange to hold together the halves of the nut and hold it in abutment with said flange will preferably be constituted by a bevel gear element for rotating said nut being formed as an unbroken ring (the bevel gear element being a tight fit on the nut so as to be able to transmit drive thereto, and a ring of electrically insulated synthetic plastics material will preferably be interposed between the nut and bevel gear element to electrically insulate the latter from the chuck jaws, the ring of electrically insulating synthetic plastics material preferably being internally flanged so that it positively retains the nut in abutment with the flange of the body part and in addition preferably being a snap fit in position within the bevel gear element).

On the other hand, means may be provided for shrouding the bevel gear element during use of the chuck. In all cases in which the bevel gear element and the nut are formed separately, a positive driving connection therebetween may be provided by means of splined or keyed interengagement.

BRIEF DESCRIPTION OF THE DRAWING

In order that the invention may be fully understood and readily carried into effect, the same will now be described, by way of example only, with reference to the accompanying drawings, of which.

DETAILED DESCRIPTION OF THE INVENTION

Figure 1:
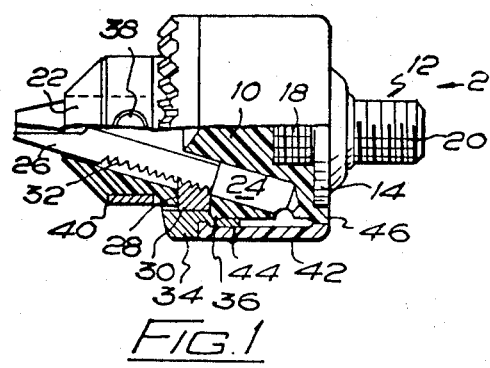
FIG. 1 is a side view, partly in longitudinal section, of a first form of drill chuck embodying the invention.
Figure 2:
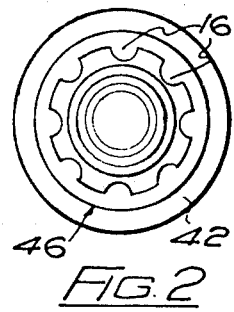
FIG. 2 is an end view thereof looking in the direction of arrow 2 in FIG. 1.

Referring now to FIG. 1 of the drawings, the first form of drill chuck embodying the invention there illustrated includes a body part 10 moulded of a synthetic plastics material. At one end, the body part is provided with a moulded-in metal insert generally indicated 12 which includes a flange 14 provided, as best seen in FIG. 2, with peripherally spaced cut-outs 16 to constitute a key between the insert and the plastics part of the body. A further key is provided by a threaded portion 18 of the insert which is embedded in the plastics part of the body. A screw-threaded spigot portion 20 of the insert is provided for connection to a power tool driving spindle (not shown).

At the other end of the body part, there has been formed an axially extending bore 22 for the reception of a drill shank (not shown). Three equally spaced bores 24 (only one of which is shown in the drawing) have also been formed in the body part so that they diverge from the axially extending bore as shown. Respective metal jaws 26 are slidably located in the bores 24 so that they can be advanced to converge and grip a drill shank between parallel end portions or can be retracted into the body part to release the drill shank.

A circumferential groove 28 has been formed around the body part intermediate its ends and breaks into the bores 24. A nut 30 is located in said groove and—being formed with a tapering internal screw-thread—has threaded engagement with threaded elements 32 of the jaws 26. Said nut has been formed in halves to enable it to be located in the groove 28 but it is encircled by a bevel gear element 34 which has been formed as an unbroken ring to hold the nut together. It is in fact an interference fit on the nut so that it can transmit drive to the latter. The bevel gear element registers on a cylindrical portion 36 of the body part which acts as a bearing for the assembled nut and bevel gear elements.

Gear teeth of the bevel gear element 34 surround a cylindrical portion of the body part in which three equally spaced radial blind bores 38 are formed, said blind bores being provided for the reception of a pilot end of a chuck key (not shown) having a bevel pinion capable of engaging the teeth of the bevel gear element. In this way, the chuck jaws can be simultaneously advanced or retracted, as required, in known manner. A metal band 40 has been located during the moulding process around the cylindrical portion of the body part in which the radial blind bores are formed to reinforce the plastics material surrounding said radial blind bores.

A synthetic plastics sleeve 42 at one end encircles a reduced diameter portion 44 of the bevel gear element and the outside diameter of said sleeve is the same as that of said bevel gear element. An inturned flange at that end of the sleeve is arranged to snap into a groove in the bevel gear element to retain it in position thereon. At its other end, the sleeve is inturned and engages rotatably on the periphery of a flange 46 which has been formed integrally with the body part at that end at which the insert 12 has been secured during the moulding process.

Thus, there is provided a drill chuck which protects the user from injury if he should happen to drill into a live electric cable and which also in these circumstances protects the windings of the power tool motor since it will be seen that the chuck jaws are electrically insulated from the screw-threaded spigot portion 20 by means of which the chuck can be secured to a power tool driving spindle. It will also be understood that having drilled into a live electric cable, the user can even touch the chuck (that is to say, the cylindrical sleeve 42 though not the bevel gear element) without receiving an electric shock.

Figure 3:
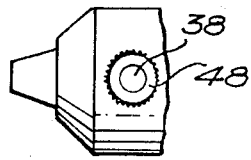
FIG. 3 is a scrap view which will presently be referred to in relation to a possible modification of this form of chuck.

However, various modifications may be made without departing from the scope of the invention. For example, in FIG. 3, which is a scrap view of a nose portion of a drill chuck otherwise the same as that illustrated in FIG. 1, there is illustrated a modification which has involved the substitution of three equally spaced metal inserts 48 (formed as respective metallic plug portions) in place of the metal band 40. The blind bores 38 are formed in the inserts 48 for the reception of a pilot end of a chuck key. The peripheries of the inserts are serrated (as shown) to provide the key in the plastics material of which the body part has been moulded.

Figure 4:
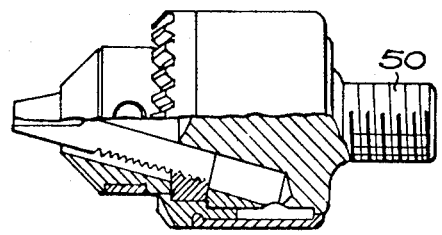
FIG. 4 is a view similar to FIG. 1, illustrating a further modification.

Referring now to FIG. 4, in a further modification, the metal insert 12 has been omitted and a spigot portion 50 has been moulded integrally with the synthetic plastics body part to be substantially screw-threaded (as shown) for connection to a power tool driving spindle. (The synthetic plastics spigot portion is of somewhat larger diameter than the metal spigot portion of the chuck illustrated in FIG. 1 to ensure that it will have adequate strength and, of course, if it is to be fitted to a power tool driving spindle of the smaller size a special adaptor will be required.) Alternatively, by omitting the metal insert 12 and moulding and subsequently screw-threading a bore in the body 10, there can be provided a means of connecting the chuck directly to a power tool driving spindle.

Figure 5:
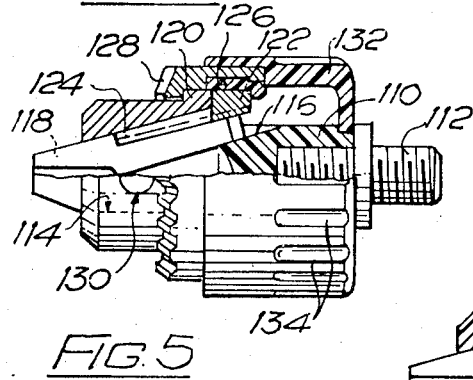
FIGS. 5 to 8 are all views similar to FIG. 1 which illustrate slightly differing constructions of a second form of drill chuck embodying the invention.

Referring now to FIG. 5 of the drawings, the second form of a drill chuck embodying the invention there illustrated includes a body part 110 moulded of an electrically insulating synthetics plastics material. At one end, the body part is provided with a screw-threaded spigot portion 112 for connection to a power tool driving spindle (not shown), the spigot portion having been formed on a metal insert as in the embodiment shown in FIG. 1 (but, of course, it will be understood that if preferred it could have been formed integrally with the body part as in the construction illustrated in FIG. 4).

At the other end of the body part, there has been formed an axially extending bore 114 for the reception of a drill shank (not shown). Three equally spaced bores 116 (only one of which is shown in the drawing) have also been formed in the body part so that they can diverge from the axially extending bore as shown. Respective metal jaws 118 are slidably located in the bores 116 so that they can be advanced to converge and grip a drill shank between parallel end portions or can be retracted into the body part to release the drill shank.

The body part is provided—intermediate its ends as shown—with a circumferential flange 120 and a nut 122 abuts against said flange, the nut being formed with a tapering internal screw-thread for engagement with thread elements 124 of the jaws 118. The nut 122 has been formed in halves to enable it to be located in position between the flange and the outer end portions of the thread elements 124 but it is encircled by an internally flanged ring 126 of electrically insulating plastics material and by a bevel gear element 128 which has been formed as an unbroken ring to hold the nut together. The presence of the ring 126 of synthetic plastics material between the nut and bevel gear element electrically insulates the latter from the nut and from the jaws 118. In addition, the internal flange of the ring 126 positively retains the nut in abutment with the flange 120 of the body part, the ring 126 being itself a snap fit in position within the bevel gear element as shown. Splines (not shown) have been provided within the bevel gear element to engage the synthetic plastics ring and within the latter to engage complementary splines (not shown) formed on the nut 122 so that there is a positive drive connection between the bevel gear element and said nut. The bevel gear element registers on the outside diameter of the circumferential flange 120 which acts as a bearing for the assembled nut and bevel gear element.

Gear teeth of the bevel gear element 128 surround a cylindrical portion of the body part in which three equally spaced radial blind bores 130 are formed, said blind bores being provided for the reception of a pilot end of a chuck key (not shown) having a bevel pinion capable of engaging the teeth of the bevel gear element for advancing or retracting the chuck jaws, as required, in known manner.

At its end remote from the bevel gear element the sleeve or cover 132 is a snap fit within a shallow groove which is formed (as shown) on the body part. The sleeve or cover is formed with a plurality of flutes 134 which provide a convenient gripping surface for the user's hand when he requires to make manual adjustments.

Thus, there is provided a drill chuck which, by virtue of the fact that the body part is made of an electrically insulating synthetic plastics material and the fact that a ring of electrically insulating synthetic plastics material is interposed between the nut 122 and bevel gear element 128, protects the user from injury if he should happen to drill into a live electric cable, for example, and which in these circumstances also protects the windings of the power tool motor. Also, by virtue of the fact that the nut 122 is not located in a circumferential groove in the body part, it has been found possible to reduce the diameter of the body part rearwards of the nut and this has been found to minimize distortion of the synthetic plastics material of which the body part is made.

Figure 6:
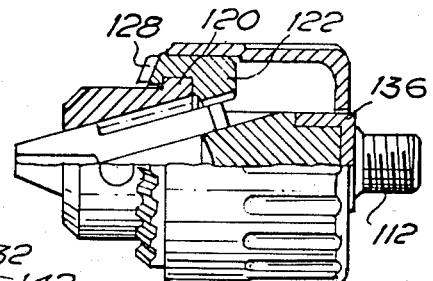

In FIG. 6 there is illustrated a drill chuck which is basically similar to that illustrated in FIG. 5 except that it is provided with a metal adaptor member 136 having a cup-like extension moulded into the body part or secured therein by an adhesive. The adaptor member incorporates the screw-threaded spigot portion 112. A further difference lies in the fact that the nut 122 and the bevel gear element 128 are formed integrally (the integral part being formed in halves of course to enable it to be engaged with the flange 120 formed on the body part). It will be seen, therefore, that there is in this case no provision for the teeth of the bevel gear element to be electrically insulated although it will be seen that in fact the synthetic plastics sleeve or cover has been extended so that it embraces the integrally formed parts rearwards of the gear teeth to hold the halves thereof together.

Figure 7:
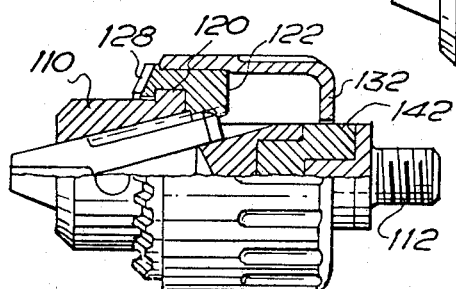

In FIG. 7, there is illustrated a chuck very similar to that described with reference to FIG. 6 but incorporating a modification which could be made to any of the various other constructions of chuck illustrated, the modification residing in the fact that the chuck body part 110 is made of metal except that it includes an electrically insulating synthetic plastics insert 142 either moulded into a recess at an end of the body part remote from the jaws or secured therein by an adhesive, the root end of the spigot portion 112 being set into the insert 142 as shown. The body part can thus be said to be in part made of a synthetic plastics material. As in the construction illustrated in FIG. 6, the nut 122 and bevel gear element 128 are shown to have been formed integrally (the integrally formed part having been formed in halves, of course, to enable it to be engaged with the flange 120 formed on the body part) so that, of course, the sleeve or cover 132 is preferably formed of a synthetic material. (Of course, it will be understood that the sleeve or cover could be made of metal since the presence of the insert 142 electrically insulates the chuck from the power tool concerned, but in this case a person drilling into a live electric cable will still be at risk if he touches said sleeve or cover without first withdrawing the drill.)

Figure 8:
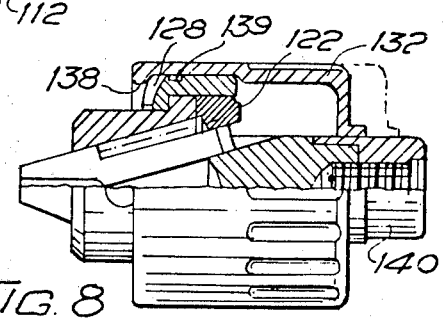

In FIG. 8, there is illustrated a further modification of the chuck illustrated in FIG. 5 in which, although the nut 122 and bevel gear element 128 are formed separately, the ring 126 of electrically insulated synthetic plastics material has been omitted. Consequently, to safeguard the user from an electric shock if he should drill into a live electric cable, the electrically insulating synthetic plastics sleeve or cover 132 has been extended so that during use its front end projects forwardly from the bevel gear teeth (which, of course, are electrically connected to the jaws). In this way, it is virtually impossible for the user to touch the gear teeth while drilling. The sleeve or cover 132 has been formed with an inturned flange 138 which can be snapped over the front end of the bevel gear element as shown before drilling commences. The sleeve or cover can be moved to a retracted position (as shown in chain-dotted lines) when it is required to engage the teeth of the chuck key (not shown) with the teeth of the bevel gear element, and in this retracted position the inturned flange engages a circumferential groove 139 which is formed intermediate the ends of the bevel gear element. It will be understood that this same modification could be made to the drill chuck illustrated in FIG. 6.

A further modification, which is illustrated in FIG. 8, is the provision of an internally threaded mount formed partly in a metal sleeve 140 which projects rearwardly of the synthetic plastics body part.

Various other modifications may be made. For example, the cylindrical sleeve 42 of the chuck illustrated in FIG. 1 could be made of metal (either of drawn tube or machined from solid bar). However, it will be understood that in this case unless such a metal sleeve is coated with an electrically insulating paint or with a synthetic plastics material, it will be possible for the user to receive an electric shock when touching the sleeve after having drilled into a live electric cable. On the other hand, the motor windings of the power tool would continue to be protected against such an accidental drilling into a live cable and the user will still be quite safe unless he actually touches the bare metal of the sleeve. Furthermore, the nut 30 and bevel gear element 34 of the chuck illustrated in FIG. 1 could be of integral construction in which case the integrally formed element would have to be made in halves to enable the nut portion to be located in the groove 28. In this case also, the cylindrical sleeve would need to be made of metal to adequately hold the two halves of the integrally formed element together, or alternatively, the synthetic plastics sleeve would need to have a metal band surrounding it or moulded integrally in it at that end which is to surround the integrally formed nut and bevel gear element to act as a suitable reinforcement therefor. The chuck body may be provided with a female threaded portion instead of a male threaded spigot portion if required; such a female thread either being formed in an alternative form of metal insert formed directly in the synthetic plastics material of which the body part is moulded. Indeed, it may be adapted for any kind of connection to a power tool driving spindle. The sleeve or cover 132 of the chuck illustrated in FIG. 5 could be made of metal since the bevel gear element 128 is electrically insulated and since the body part 110, which it embraces, is made of a synthetic plastics material. In all the constructions in which the bevel gear element is formed separately from the nut, it may be found that an adequate driving connection can be provided by the bevel gear element being a tight fit upon the nut without there being a splined driving connection between them. Furthermore, in all the constructions in which the screw-threaded spigot portion is formed on a metal insert, the latter may be secured in the body part by a diametrically extending pin instead of being moulded therein or secured therein solely by an adhesive.

What is claimed is:

1. A drill chuck for an electric power drill having a spindle for driving the chuck, the chuck comprising a body formed of an electrical insulating plastics material, a metal insert keyed into the rear of the body having an axially extending threaded portion for mounting the chuck to the spindle of the drill, the body having a bore extending axially and partway into the front end of the body for reception of a drill shank, three equally spaced slidable jaw tracks formed in the body diverging rearwardly from the bore partway into the body, a slidable shank gripping metal jaw in each track, a metal nut supported upon the body for relative rotation having an internal threaded engagement with the jaws for slidably advancing them and retracting them along the jaw tracks, a metal bevel ring gear fixed around the nut for selectively rotating the nut relative to the jaws to effect advancement and retraction of the jaws, the body having a cylindrical nose portion of reduced diameter extending forwardly of the bevel ring gear, there being a radial blind hole in the nose portion adapted for reception of the pilot of a chuck key having a gear cooperable with the bevel ring gear for rotating the latter, and a sleeve of electrical insulating plastics material covering over the body rearwardly of the bevel ring gear and in radial spaced relation to the metal insert.

2. A drill chuck according to claim 1, wherein the radial blind hole is reinforced by a metal ring disposed about the nose portion.

3. A drill chuck according to claim 1, wherein the sleeve has a snap connection with the bevel ring gear enabling their rotation in unison.

4. A drill chuck according to claim 3, wherein the nut comprises two half-sections retained in place by means of the bevel gear.

5. A drill chuck according to claim 1, wherein a metal ring plug inserted in the radial blind hole reinforces the wall of the latter.

* * * * *